(12) United States Patent
Liedtke et al.

(10) Patent No.: US 12,139,941 B2
(45) Date of Patent: Nov. 12, 2024

(54) DECENTRALISED CONTROL UNIT OF A MOTOR VEHICLE

(71) Applicant: Brose Fahrzeugteile SE & Co. Kommanditgesellschaft, Bamberg, Bamberg (DE)

(72) Inventors: Thomas Liedtke, Eisenach (DE); Bernd Herthan, Michelau (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 301 days.

(21) Appl. No.: 17/635,432

(22) PCT Filed: Aug. 13, 2020

(86) PCT No.: PCT/EP2020/072780
§ 371 (c)(1),
(2) Date: Feb. 15, 2022

(87) PCT Pub. No.: WO2021/032595
PCT Pub. Date: Feb. 25, 2021

(65) Prior Publication Data
US 2022/0307295 A1  Sep. 29, 2022

(30) Foreign Application Priority Data
Aug. 16, 2019  (DE) .................... 10 2019 122 108.0

(51) Int. Cl.
*E05B 81/06* (2014.01)
*E05B 77/04* (2014.01)
(Continued)

(52) U.S. Cl.
CPC .............. *E05B 81/06* (2013.01); *E05B 77/04* (2013.01); *E05B 81/14* (2013.01); *H04B 1/3822* (2013.01)

(58) Field of Classification Search
CPC .......... E05B 81/06; E05B 81/14; E05B 77/04; E05B 77/02; E05B 77/48; H04B 1/3822
See application file for complete search history.

(56) References Cited

U.S. PATENT DOCUMENTS 7,438,346 B1    10/2008  Breed
2010/0250052 A1  9/2010  Ogino
(Continued)

FOREIGN PATENT DOCUMENTS

DE          19629709 A1     1/1998
DE    102017122021 A1 *    3/2019
(Continued)

*Primary Examiner* — Michael J Zanelli
(74) *Attorney, Agent, or Firm* — Dickinson Wright PLLC (57) ABSTRACT

A decentralized control unit of a motor vehicle, the decentralized control unit having a communication controller, which when installed, communicates via an antenna arrangement with a wireless communication network external to the vehicle by means of a mobile communication standard in order to provide a peripheral function. According to the invention, the communication controller, when installed, generates digital data signals in a preprocessing routine from antenna signals received via the antenna arrangement, and communicates the data signals to a central control unit of the motor vehicle via a communication network internal to the motor vehicle for completion of the peripheral function there.

18 Claims, 3 Drawing Sheets

(51) Int. Cl.
   *E05B 81/14*   (2014.01)
   *H04B 1/3822*   (2015.01)

(56) References Cited

U.S. PATENT DOCUMENTS

| | | | |
|---|---|---|---|
| 2016/0173330 A1* | 6/2016 | Yun | H04L 12/413 |
| | | | 370/255 |
| 2016/0269524 A1* | 9/2016 | Stottlemyer | H04M 1/6091 |
| 2017/0288881 A1* | 10/2017 | Marko | H04W 12/082 |
| 2017/0295478 A1* | 10/2017 | Jaggi | G06F 16/248 |
| 2018/0147986 A1 | 5/2018 | Chi et al. | |
| 2018/0219878 A1* | 8/2018 | Hirshberg | G06F 21/85 |
| 2019/0316388 A1* | 10/2019 | Götzen | E05B 81/40 |
| 2020/0384858 A1* | 12/2020 | Prottengeier | B60K 35/00 |
| 2022/0224672 A1* | 7/2022 | Kaneko | H04L 63/0227 |

FOREIGN PATENT DOCUMENTS

| | | |
|---|---|---|
| DE | 102018206598 B3 | 9/2019 |
| EP | 3493417 A1 | 6/2019 |
| JP | 2002256764 A | 9/2002 |
| KR | 0181870 B1 * | 4/1999 |

\* cited by examiner

DECENTRALISED CONTROL UNIT OF A MOTOR VEHICLE

CROSS-REFERENCE TO RELATED APPLICATIONS

This application is the U.S. National Phase of PCT Application No. PCT/EP2020/072780 filed on Aug. 13, 2020, which claims priority to German Patent Application No. DE 10 2019 122 108.0, filed on Aug. 16, 2019, the disclosures of which are hereby incorporated in their entirety by reference herein.

TECHNICAL FIELD

The present disclosure relates to a control system such as a decentralized control unit of a motor vehicle.

BACKGROUND

Modern motor vehicles have antenna arrangements for communicating with wireless communication networks outside the vehicle by means of a mobile radio communication standard. Peripheral functions of the motor vehicle can be provided via the received antenna signals. Here, peripheral functions are functions of a control system of the motor vehicle which do not relate directly to the vehicle control of the motor vehicle. The peripheral function provides, in particular, communication between the motor vehicle and further vehicles, mobile devices and the traffic infrastructure, which is generally summarized by the term vehicle-to-everything (V2X) communication.

It is known to provide a plurality of antenna arrangements to receive the wireless signals from the wireless communication network outside the vehicle. The antenna arrangements are distributed in external components of the motor vehicle in order to ensure reliable reception from different sides of the motor vehicle. In a control system, the antenna arrangements are connected in each case individually to the central control unit of the motor vehicle, and the central control unit provides the peripheral function on the basis of the received antenna signals. The processing of the received data signals for the provision of the peripheral function and, in particular, the decoding of the antenna signals are performed by the central control unit.

One challenge lies in the fact that the connection of the individual antenna arrangements to the central control unit is comparatively complex and requires, in particular, a costly cabling of the control system. The central control unit must further be designed for the complete processing of the antenna signals of all antenna arrangements.

SUMMARY

One or more objects of the present disclosure is to indicate components for a control system of a motor vehicle which simplify the processing of the received antenna signals and improve the communication between the antenna arrangements and the central control unit.

It has been recognized according to the proposal that a decentralized control unit having a communication controller can be used to take charge partially of the processing of the received antenna signals in order to provide the peripheral function. The communication controller can simultaneously generate digital data signals which are suitable for communicating in a communication network inside the vehicle. The communication connection between the decentralized control unit and the central control unit is simplified via the communication network inside the vehicle.

As an example, it is proposed that the communication controller, in the installed state, generates digital data signals in a preprocessing routine from antenna signals received via the antenna arrangement and communicates the data signals to a central control unit of the motor vehicle via a communication network of the motor vehicle inside the vehicle for the accomplishment there of the peripheral function.

This may enable the implementation of the communication inside the vehicle, such as via a simple cabling, for a wired communication network inside the vehicle. Via the preprocessing routine, resources are furthermore sparingly used in the central control unit for providing the peripheral function.

In one or more embodiments, the decentralized control unit has a door controller which provides a motor-driven closing function for a movement element of the vehicle.

Other embodiments relate to a provision of V2X communication between the motor vehicle and an object outside the vehicle by means of the peripheral function. Another embodiment relates to the provision of broadcasting reception within a digital broadcasting system by means of the peripheral function.

Other embodiments may include implementation of the preprocessing routine.

According to one or more embodiments, which in each case have independent significance, a decentralized control arrangement having a decentralized control unit according to the proposal and an antenna arrangement, a control system of a motor vehicle, a component of a motor vehicle, and a motor vehicle are described as such. Reference can be made to all explanations relating to the decentralized control unit according to the proposal with regard to these further respectively independent teachings.

According to another embodiment, which similarly has independent significance, a method is provided for operating a control system of a motor vehicle as such. According to the proposed method, a decentralized control unit is provided, and the decentralized control unit has a communication controller. In this respect also, reference can be made to all explanations relating to the decentralized control unit according to the proposal.

In one or more embodiments, at least a part of the central control unit is switched by means of the communication controller from a standby state to an operational state or remains in the operational state.

BRIEF DESCRIPTION OF THE DRAWINGS

The invention is explained in detail below with reference to a drawing representing only one example embodiment. In the drawing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure relates to a decentralized control unit 1 of a motor vehicle, and the decentralized control unit 1 has a communication controller 2. In the installed state shown in FIG. 1, the communication controller 2 communicates via an antenna arrangement 3 with a wireless communication network 4 outside the vehicle by means of a mobile radio communication standard in order to provide a peripheral function.

Figure 1:
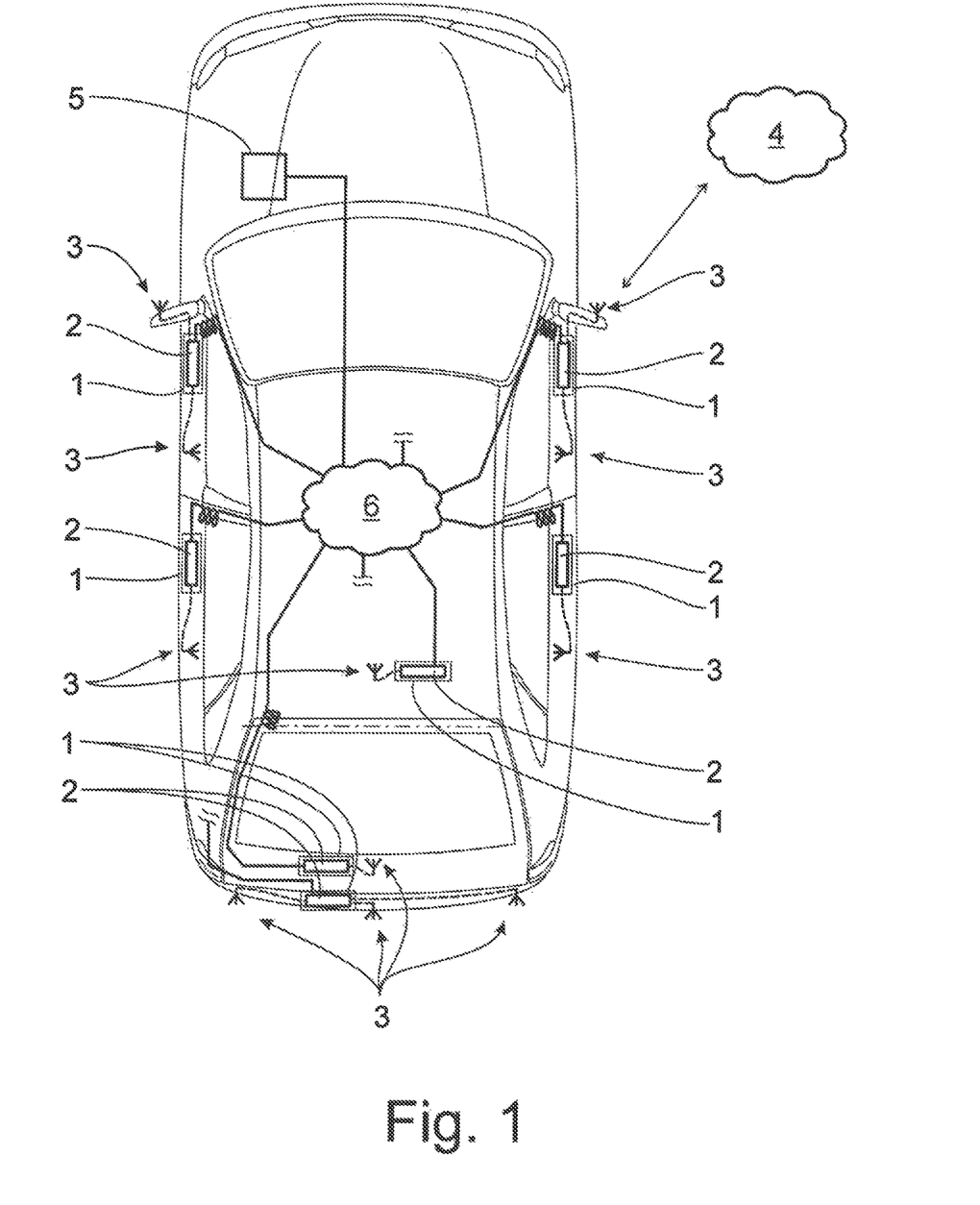
FIG. 1 shows a motor vehicle according to the proposal with decentralized control units according to the proposal as components of a control system according to the proposal.

A plurality of decentralized control units 1 which are arranged on different external components of the motor vehicle are shown in a control system in FIG. 1. Insofar as only one decentralized control unit 1 and one antenna arrangement 3 are explained below, these explanations may also apply to all other decentralized control units 1 and antenna arrangements 3 shown in FIG. 1.

The wireless communication network 4 outside the vehicle is based on mobile radio technology according to a mobile radio communication standard. The mobile radio communication standard may be a standard of the 3rd Generation Partnership Project (3GPP). Examples of this are the Global System for Mobile Communications (GSM), the Universal Mobile Telecommunications System (UMTS) and Long Term Evolution (LIE) or LTE-Advanced (LTE-A). In another embodiment, the mobile radio communication standard is the 5G standard which enables improved mobile broadband access and very short response times within the communication network 4 outside the vehicle.

The antenna arrangement 3 receives wireless data signals here from the communication network 4 outside the vehicle and transmits the data signals to the communication controller 2. The antenna arrangement 3 and the communication control 2 may communicate with one another here via a wired line. Alternatively or additionally, the received signals can also be transmitted wirelessly by means of the antenna arrangement 3. The antenna arrangement 3 can similarly be used to transmit wireless data signals into the communication network 4, and the communication controller 2 transmits data signals to be transmitted to the antenna arrangement 3.

The "installed state" of the communication controller 2 means that the communication controller 2 is configured to perform the communication described here with the provision of the antenna arrangement 3 and the communication network 6.

The communication controller 2 can additionally be configured for communication via a local radio network technology, e.g. according to a Bluetooth standard and/or via a wireless local communication network, for example via a communication network according to a standard of the IEEE-802.11 standard family. The communication controller 2 may also be configured to receive amplitude-modulated (AM) broadcasting signals and/or frequency-modulated (FM) broadcasting signals received via the antenna arrangement 3.

As an example, the communication controller 2, in the installed state, generates digital data signals in a preprocessing routine from antenna signals received via the antenna arrangement 3 and communicates the data signals to a central control unit 5 of the motor vehicle via a communication network 6 of the motor vehicle inside the vehicle for the accomplishment there of the peripheral function.

As explained above, the peripheral function is a function of the control system of the motor vehicle which does not relate directly to the vehicle control. The peripheral function does not therefore relate directly to the control of the vehicle drive, the braking system and the vehicle steering. Functions of the central control unit 5 relating to telephony voice communication via the wireless communication network 4 outside the vehicle are similarly excluded with the peripheral function.

The communication network 6 inside the vehicle may provide communication here between the communication controllers 2 of the respective decentralized control units 1 and with the central control unit 5. Control components, for example, of the vehicle drive, of comfort functions, of the driver assistance or the like can further communicate with the central control unit 5 via the communication network 6 inside the vehicle.

The communication controller 2 is configured to generate digital data signals in the preprocessing routine from the received antenna signals for transmission in the communication network 6 inside the vehicle and to make the digital data signals available to the communication network 6 inside the vehicle for communication to the central control unit 5, such as by means of a network interface.

It is crucial that the received antenna signals are processed in order to provide the peripheral function. A part of this processing is performed in the preprocessing routine by means of the communication controller 2. The remaining part of the processing is performed by means of the central control unit 5 in order to accomplish the provision of the peripheral function.

In one or more embodiments, the decentralized control unit 1 may include a door controller 7 which provides a motor-driven closing function for a movement element of the vehicle. Examples of movement elements are side doors, rear doors, tailgates, trunk lids, engine hoods or the like. A motor-driven closing function is understood to mean that a movable locking element of the vehicle is moved, for example opened or closed and/or locked or unlocked, directly or indirectly by a movement generated by an electrical drive 8. The door controller 7 takes charge here of the control of the electrical drive 8. The decentralized control unit 1 can be integrated here together with the door controller 7 into a component of the motor vehicle.

Figure 2:
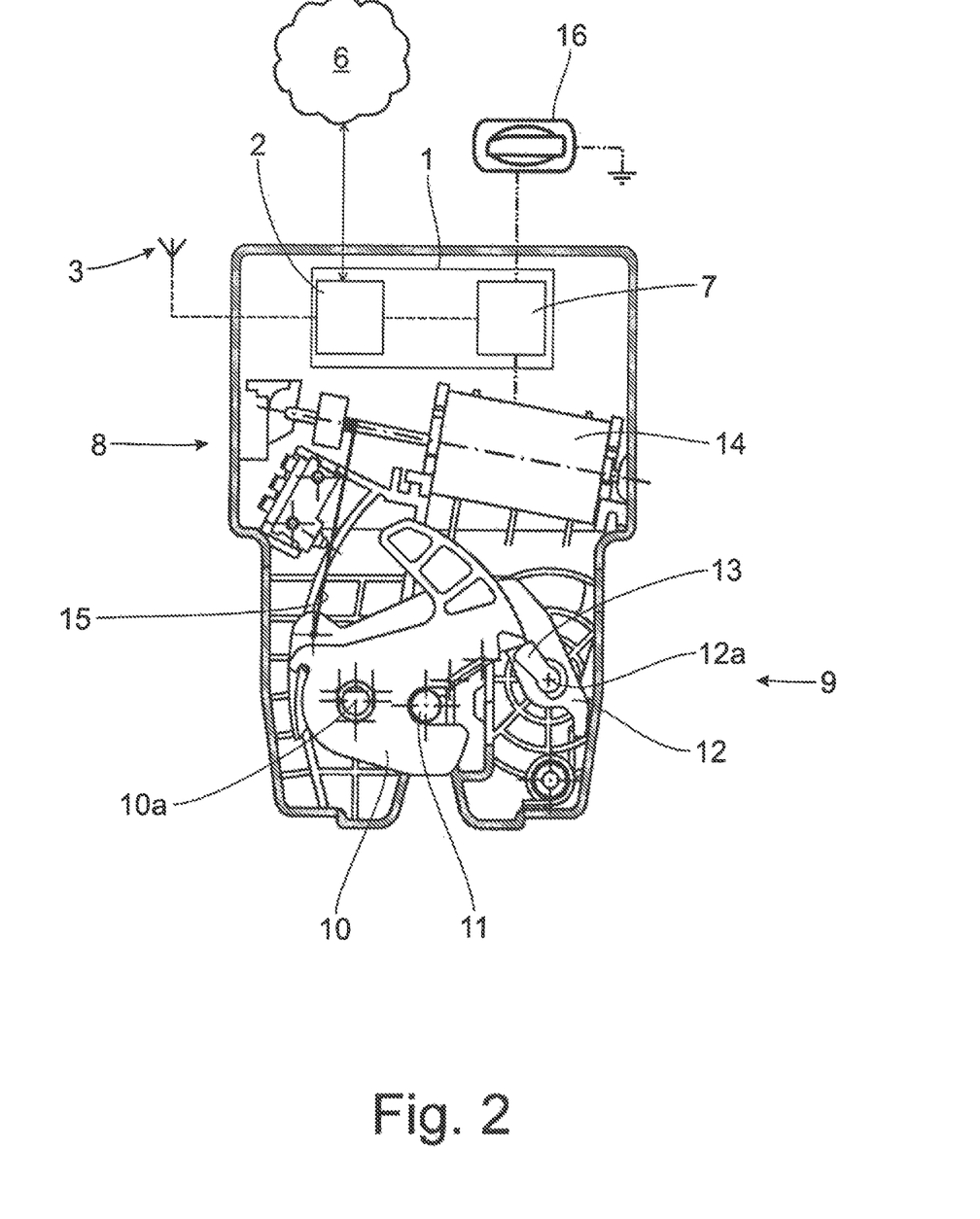
FIG. 2 shows a decentralized control unit according to the proposal with a door controller for a motor vehicle lock of the motor vehicle shown in a side view.

In the example embodiment shown in FIG. 2, the door controller 7 is assigned to a motor vehicle lock 9. The motor vehicle lock 9 is equipped with a lock catch 10 pivotable around a lock catch axis 10a for the retaining operation with a closing part 11 and a retaining pawl 12 assigned to the lock catch 10 and pivotable around a retaining pawl axis 12a. The closing part 11 can be a closing bracket, a closing bolt or the like. The motor vehicle lock 9 is arranged, for example, on a locking element, whereas the closing part 11 is arranged permanently attached to the motor vehicle body.

The retaining pawl 12 can be moved into a sunken position shown in FIG. 2 in which it holds the lock catch 10, here by means of a retaining pawl spike 13 in the closing position shown. The retaining pawl 12 can further be lifted in a motor-driven manner by means of the electrical drive 8. A drive motor may be connected with a drive cable 15 to the retaining pawl 12 for this purpose. In FIG. 2, the motor-driven lifting of the retaining pawl 12 is a pivoting of the retaining pawl 12 clockwise around the retaining pawl axis 12a. The retaining pawl 12 can essentially also be part of a retaining pawl system consisting of two or more sequentially arranged retaining pawls which are assigned to the lock catch 10.

The motor-driven lifting of the retaining pawl 12 is triggered, for example, by an actuation of a door handle 16. To do this, the door handle 16 is equipped with a sensor or the like which detects an actuation of the door handle 16 and transmits an actuation signal to the door controller 7 in response to the detection. The door controller 7, in the installed state, can trigger the motor-driven locking function in response to the received actuation signal or can instigate its triggering in that the door controller 7 controls the electrical drive 8.

Along with or instead of the locking function of the motor vehicle lock 9 explained in detail here, the door controller 7 can similarly control a drive arrangement for the motor-driven movement of an aforementioned locking element of the motor vehicle, and the drive arrangement serves to provide a motor-driven movement, such as an opening and/or closing, of the locking element. FIG. 2 similarly shows, by way of example, that the door controller 7 is integrated into the motor vehicle lock 9. However, the door controller 7 can also be designed as a separate component and can control, for example, locking functions for a plurality of movement elements. The electrical drives 8 of a plurality of motor vehicle locks 9 are controlled, for example, as described above, by means of the door controller 7.

The door controller 7, in the installed state, may perform the motor-driven locking function depending on the peripheral function. The provision of the peripheral function via the communication with the wireless communication network 4 outside the vehicle is used, such as, to trigger the locking function, to modify a triggering of the locking function and/or to prevent a triggering.

Figure 3:
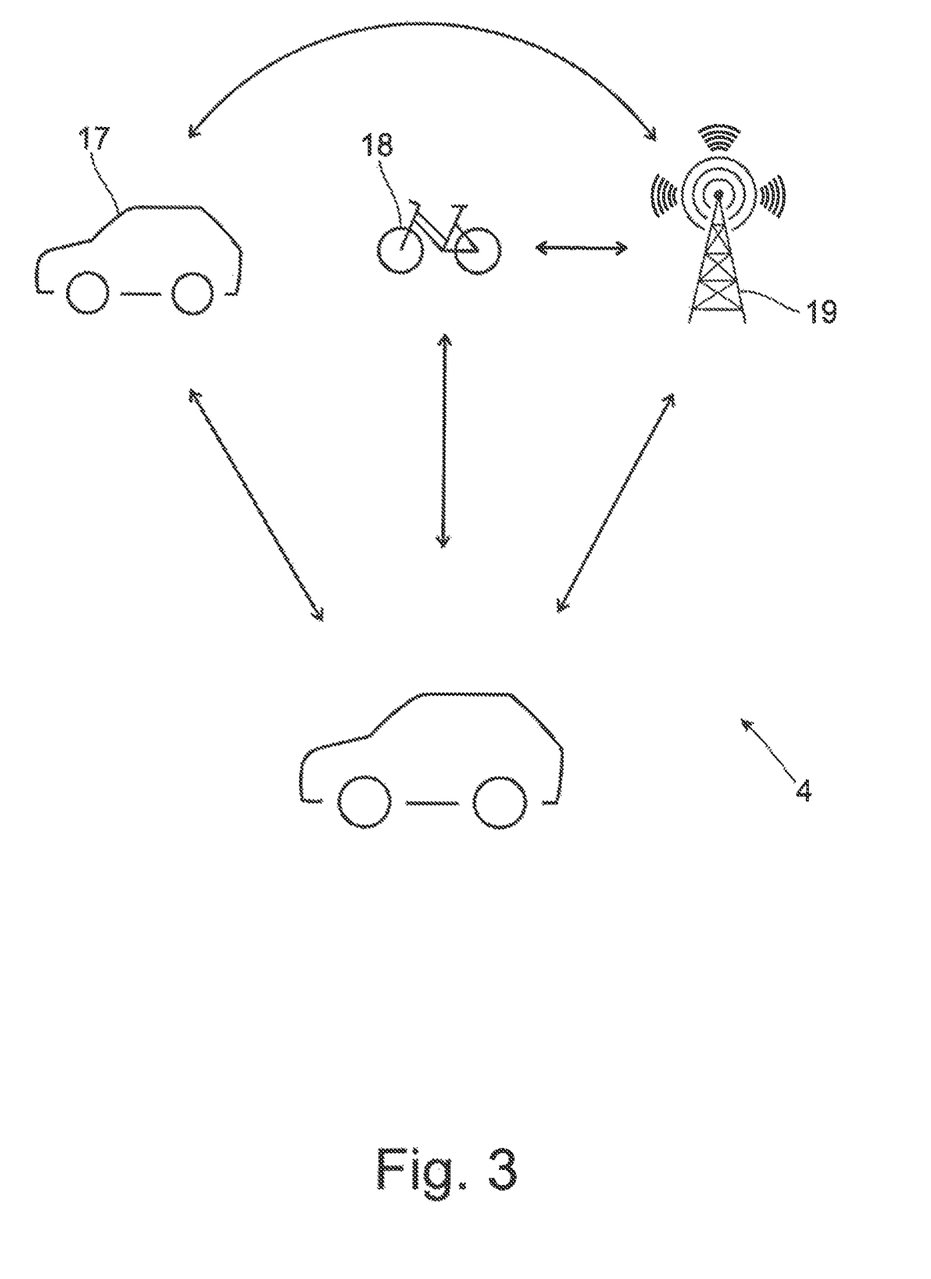
FIG. 3 shows a schematic view of a V2X communication between the motor vehicle and objects outside the vehicle.

According to another embodiment, the peripheral function provides V2X communication between the motor vehicle and an object 17, 18, 19 outside the vehicle. The functionalities summarized by the term V2X comprise direct communication between the motor vehicle and further vehicles 17, 18 (vehicle-to-vehicle, V2V), between the motor vehicle and the infrastructure (vehicle-to-infrastructure, V2I), and further road users such as, for example, pedestrians (vehicle-to-pedestrian, V2P). In this respect, FIG. 3 shows schematically a communication between the motor vehicle and vehicles 17, 18, here a further motor vehicle 17 and a bicycle 18, and a communication between the motor vehicle and the infrastructure 19. The infrastructure 19 can be a network infrastructure of the communication network 4 outside the vehicle or a traffic infrastructure. Via the V2X communication, data relating to the traffic situation can be exchanged between the road users directly or indirectly via the network infrastructure. The antenna signals received via the antenna arrangement 3 are, for example, at least indicative of a position, a speed and/or a direction of movement of the object 17, 18, 19 outside the vehicle.

According to one or more embodiments, the peripheral function provides a collision detection function between the motor vehicle and the object 17, 18, 19 outside the vehicle. The position, speed and/or direction of movement of the motor vehicle are compared, for example, in a collision detection routine by means of the central control unit 5 with the position, speed and/or direction of movement of the object 17, 18, 19 received via the communication network 4 outside the vehicle in order to detect a possible collision with one another.

In a further design, the peripheral function provides an autonomous driving function of the motor vehicle. Along with the above-mentioned collision detection function, which can similarly be used for the autonomous driving, one example of an autonomous driving function is a provision of data relating to traffic density which can be used to optimize the autonomous navigation of the motor vehicle.

According to another embodiment, the door controller 7, in the installed state, triggers the motor-driven locking function in response to a received actuation signal, here, for example, from the door handle 16, subject to a detection provided by the collision detection function of a possible collision between the motor vehicle and the object 17, 18, 19 outside the vehicle. In the collision detection routine, the position, speed and/or direction of movement of the motor vehicle are compared, for example, by means of the control unit 5 with the position, speed and/or direction of movement of the object 17, 18, 19 outside the vehicle received via the communication network 4 outside the vehicle in order to determine whether a movement of the movement element initiated via the motor-giving locking function can cause a collision.

In the present example embodiment of the door controller 7 for the motor vehicle lock 9, a check is carried out, for example, in the collision detection routine to determine whether the opening of the movement element, for example a side door, initiated by the unlocking of the retaining pawl 12 can result in a collision with a further vehicle 17, 18. In the event of a possible collision, a triggering of the motor-driven locking function by means of the door controller 7 does not occur or a triggering is prevented so that, in the present example, the retaining pawl 12 remains in the retaining position and an opening of the movement element by the user is not possible.

In a further embodiment, the peripheral function provides broadcasting reception within a digital broadcasting system, preferably in accordance with the specification for Digital Audio Broadcasting (DAB) which is standardized under the ETSI EN 300 401 standard, and/or the specification for Satellite Digital Audio Radio Services (SDARS). A further example of a peripheral function is the provision of data using the technology of the Vehicle Information and Communication System (VICS).

According to another embodiment, the communication controller, in the installed state, performs a decoding of the received antenna signals in the preprocessing routine in order to generate the digital data signals. The central control unit 5 of the motor vehicle can accordingly perform an evaluation of the decoded digital data signals in order to accomplish the peripheral function, whereby resources are sparingly used in the central control unit 5. In the above-mentioned design relating to a collision detection function, the antenna signals are decoded, for example, by means of the communication controller 2 and are communicated via the communication network 6 to the central control unit 5. The central control unit 5 performs the collision detection routine on the basis of the decoded data signals. The result of the collision detection routine and, in particular, a detection of a possible collision can in turn be communicated by the central control unit 5 via the communication network 6 inside the vehicle to the decentralized control unit 1 and therefore to the door controller 7. However, the decentralized control unit 1 can also perform a preprocessing in the preprocessing routine which goes beyond the decoding, wherein, for example, the position, speed and/or direction of movement of the object 17, 18, 19 outside the vehicle are determined by means of the decentralized control unit 1 from the decoded data signals and are communicated to the central control unit 5 in order to perform the collision detection routine.

The communication controller 2, in the installed state, can similarly perform an analog-to-digital conversion of the received antenna signals in the preprocessing routine in order to generate the digital data signals, for example to provide the broadcasting reception within the digital broadcasting system.

In a further embodiment, the communication controller 2, in the installed state, converts the received data signals in the preprocessing routine into digital data signals according to a local network standard specified for the communication network 6 inside the vehicle. The local network standard is preferably an Ethernet standard according to the IEEE-802.11 standard family. The communication network 6 inside the vehicle can be a wired communication network, in particular on the basis of twisted-pair cabling.

According to a further design, the communication controller 2, in the installed state, checks the received data signals in the preprocessing routine for compliance with a set of firewall rules and communicates the data signals to the central control unit of the motor vehicle only in the event of compliance with the set of firewall rules. The set of firewall rules has, in particular, packet filters which perform a filtering on the basis of the network address. As a result of the check for compliance with the set of firewall rules via the communication controller 2, a proxy filtering of the received antenna signals can be performed and access security can be increased. At the same time, resources are sparingly used in the central control unit 1.

According to a further teaching, which has independent significance, a decentralized control arrangement having a decentralized control unit 1 according to the proposal and the antenna arrangement 3 assigned to the decentralized control unit is provided as such. A plurality of antenna arrangements 3 can also be assigned to the decentralized control unit 1 within the decentralized control arrangement. Reference can be made to all explanations relating to the decentralized control unit 1 according to the proposal.

According to a further teaching, which similarly has independent significance, the control system of the motor vehicle described above having the central control unit 5 and a plurality of decentralized control arrangements which in each case have a communication controller 2 which communicates with the central control unit 5 via the communication network 6 of the motor vehicle inside the vehicle is provided as such. At least one of the decentralized control arrangements is designed as a control arrangement according to the proposal. In this respect also, reference can be made to all explanations relating to the decentralized control unit 1 according to the proposal.

According to a further teaching, which similarly has independent significance, a component of a motor vehicle which has the decentralized control unit 1 according to the proposal or the decentralized control arrangement according to the proposal is provided as such. The term "component" is to be understood broadly here, wherein parts of the assemblies of a motor vehicle are also included herewith, for example a side area, rear area or front area of a motor vehicle body. In other designs, the component is a movement element such as a side door, a rear door, a tailgate, a trunk lid, an engine hood and/or a cladding element, for example a side sill, a roof cladding or a pillar cladding. Further examples are external components such as wing mirrors, bumpers, spoilers, actuation elements or the like.

The antenna arrangement 3 can be disposed, for example, in or on a wing mirror, an actuation element such as a door handle 16, the B-pillar cladding and/or side sill.

In the embodiment of a decentralized control unit 1 described above having a door controller 7, assigned antenna arrangements 3 are disposed, for example, in or on a wing mirror, actuation element, the B-pillar cladding and/or side sill, while the decentralized control unit 1 is arranged, in particular, in or on the side door. In addition, with regard to the component according to the proposal, reference can be made to all explanations relating to the decentralized control unit 1 according to the proposal.

According to a further teaching, which similarly has independent significance, a motor vehicle having a control system according to the proposal is provided as such. In this respect also, reference can be made to all explanations relating to the decentralized control unit 1 according to the proposal.

A further teaching, which similarly has independent significance, relates to a method for operating a control system of a motor vehicle having a decentralized control unit 1, wherein the decentralized control unit 1 has a communication controller 2, wherein the communication controller 2 communicates via an antenna arrangement 3 with a wireless communication network 4 outside the vehicle by means of a mobile radio communication standard in order to provide a peripheral function. An essential feature of the method according to the proposal is that digital data signals are generated in a preprocessing routine from antenna signals received via the antenna arrangement 3 and the data signals are communicated to a central control unit 5 of the motor vehicle via a communication network 6 of the motor vehicle inside the vehicle for the accomplishment there of the peripheral function. The method according to the proposal is performed, in particular, using a decentralized control unit 1 according to the proposal, so that reference can be made in this respect also to all explanations relating to the decentralized control unit 1 according to the proposal.

In one or more methods, at least a part of the central control unit 5 is switched by means of the communication controller 2 from a standby state to an operational state or at least a part of the central control unit 5 remains in the operational state. A resource-sparing standby state may be provided here for at least a part of the central control unit 5. The standby state may be a state in which the central control unit 5 provides a restricted functional scope. A check can be carried out, for example, in the preprocessing routine by means of the communication controller 2 to determine whether an operational state of at least the part of the central control unit 5 is required for the provision of the peripheral function and, if the operational state of the central control unit 5 is required, a wake-up of the central control unit 5 is performed via the communication network 6 inside the vehicle. The central control unit 5 provides further functions, for example for the accomplishment of a peripheral function, only after the wake-up of the central control unit 5 into the operational state.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS

1 decentralized control unit
2 communication controller 3 antenna arrangement
4 wireless communication network
5 central control unit
6 communication network
7 door controller
8 electrical drive
9 motor vehicle lock
10 lock catch
11 closing part
12 pawl
13 pawl spike
15 drive cable
16 door handle
17 object, vehicle
18 object, bicycle
19 object, infrastructure
10a lock catch axis
12a pawl axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A decentralized control unit for use in a motor vehicle, the decentralized control unit comprising:
   a communication controller configured to operate in an installed state, in which the communication controller is configured to communicate, via an antenna arrangement, with a wireless communication network disposed outside the vehicle by means of a mobile radio communication standard to provide a peripheral function,
   wherein when the communication controller is in the installed state, the communication controller is configured to,
   generate digital data signals during a preprocessing routine from antenna signals received by the antenna arrangement, and
   communicate the digital data signals to a central control unit of the motor vehicle via a communication network of the motor vehicle disposed inside the vehicle to accomplish the peripheral function,
   wherein the decentralized control unit includes a door controller configured to provide a motor-driven locking function for a movement element of the motor vehicle.

2. The decentralized control unit of claim 1, wherein the peripheral function provides a vehicle-to-everything communication between the motor vehicle and an object outside the vehicle.

3. The decentralized control unit of claim 1, wherein the peripheral function provides a broadcasting reception within a digital broadcasting system.

4. The decentralized control unit of claim 1, wherein the communication controller, in the installed state, is configured to perform a decoding and/or an analog-to-digital conversion of the received antenna signals during the preprocessing routine in order to generate the digital data signals.

5. The decentralized control unit of claim 4, wherein the central control unit of the vehicle is configured to perform an evaluation of the decoded digital data signals in order to accomplish the peripheral function.

6. The decentralized control unit of claim 1, wherein the communication controller, in the installed state, is configured to convert the received antenna signals into the digital data signals during the preprocessing routine according to a local network standard specified for the communication network inside the vehicle.

7. The decentralized control unit of claim 6, wherein the local network standard is an Ethernet standard.

8. The decentralized control unit of claim 1, wherein the communication controller, in the installed state, is configured to check the received antenna signals during the preprocessing routine for compliance with a set of firewall rules, and wherein the communication controller is configured to communicate the digital data signals to the central control unit in response to compliance with the set of firewall rules.

9. The decentralized control unit of claim 1, wherein when the door controller is in an installed state, the door controller is configured to perform the motor-driven locking function based on the peripheral function.

10. The decentralized control unit of claim 1, wherein the peripheral function provides a collision detection function between the motor vehicle and an object disposed outside the vehicle and/or an autonomous driving function of the motor vehicle.

11. The decentralized control unit of claim 10, wherein the door controller, in the installed state, is configured to trigger the motor-driven locking function in response to receiving an actuation signal subject to a detection provided by the collision detection function of a possible collision between the motor vehicle and the object outside the vehicle, wherein triggering of the motor-driven locking function does not occur or is prevented in response to a possible collision.

12. A method of operating a control system for use in a motor vehicle, the control system including a decentralized control unit provided with a communication controller configured to communicate, via an antenna arrangement, with a wireless communication network disposed outside the motor vehicle, according to a mobile radio communication standard, in order to provide a peripheral function, the method comprising:
   receiving, by the antenna arrangement, antenna signals;
   generating, during a preprocessing routine, digital data signals from the antenna signals received by the antenna arrangement; and
   communicate, via a communication network disposed in the motor vehicle, to a central control unit of the motor vehicle to accomplish the peripheral function,
   wherein the decentralized control unit includes a door controller configured to provide a motor-driven locking function for a movement element of the motor vehicle.

13. The method of claim 12, further comprising:
   switching, by means of the communication controller, at least a portion of the central control unit from a standby state to an operational state.

14. A control system for use in a motor vehicle, the control system comprising:
   a central control unit; and
   a plurality of decentralized control arrangements each including a communication controller configured to,
   communicate with the central control unit via a vehicle communication network disposed inside the vehicle,
   communicate, via an antenna arrangement, with a wireless communication network disposed outside the vehicle according to a mobile radio communication standard to provide a peripheral function, generate digital data signals during a preprocessing routine from antenna signals received by the antenna arrangement, and communicate the digital data signals to the central control unit of the motor vehicle via a communication network of the motor vehicle disposed inside the vehicle to accomplish the peripheral function, wherein the plurality of decentralized control arrangements include a door controller configured to provide a motor-driven locking function for a movement element of the motor vehicle.

15. The control system of claim 14, wherein the door controller is configured to trigger the motor-driven locking function in response to receiving an actuation signal subject to a collision detection function of a possible collision between the motor vehicle and an object disposed outside the vehicle.

16. The control system of claim 15, wherein triggering of the motor-driven locking function does not occur or is prevented in response to the possible collision.

17. The control system of claim 14, further comprising:
a motor vehicle lock provided with the door controller and a motor configured to provide the motor-driven locking function.

18. The control system of claim 17, wherein the motor vehicle lock includes the communication controller.

* * * * *